(12) United States Patent
Aoki et al.

(10) Patent No.: US 7,159,895 B2
(45) Date of Patent: Jan. 9, 2007

(54) OCCUPANT RESTRAINT SYSTEM

(75) Inventors: Takashi Aoki, Wako (JP); Hidetoshi Utsumi, Wako (JP); Naoki Takemura, Wako (JP); Yuichi Saito, Haga-Gun (JP)

(73) Assignee: Honda Motor Co., Ltd., Tokyo (JP)

( * ) Notice: Subject to any disclaimer, the term of this patent is extended or adjusted under 35 U.S.C. 154(b) by 179 days.

(21) Appl. No.: 10/750,739

(22) Filed: Dec. 30, 2003

(65) Prior Publication Data

US 2004/0212179 A1 Oct. 28, 2004

(30) Foreign Application Priority Data

Jan. 7, 2003 (JP) ............................ 2003-000798

(51) Int. Cl.
*B60R 21/233* (2006.01)
(52) U.S. Cl. .................................... 280/730.2; 280/729
(58) Field of Classification Search ............. 280/730.2, 280/743.1, 729
See application file for complete search history.

(56) References Cited

U.S. PATENT DOCUMENTS

| | | | | |
|---|---|---|---|---|
| 6,220,625 B1 * | 4/2001 | Wallner et al. | ........... | 280/730.2 |
| 6,616,178 B1 * | 9/2003 | Nanbu | .................... | 280/730.2 |
| 6,705,636 B1 * | 3/2004 | Takahara | ................. | 280/728.2 |
| 6,843,502 B1 * | 1/2005 | Aoki et al. | .............. | 280/730.2 |
| 6,945,558 B1 * | 9/2005 | Hall et al. | ............... | 280/730.2 |
| 2002/0153713 A1 * | 10/2002 | Fischer | .................... | 280/730.2 |
| 2002/0175503 A1 * | 11/2002 | Hess et al. | ............... | 280/730.2 |
| 2003/0178820 A1 * | 9/2003 | Green et al. | ............. | 280/730.2 |

FOREIGN PATENT DOCUMENTS

| | | |
|---|---|---|
| JP | 2000-43670 | 2/2000 |
| JP | 2002-19567 | 1/2002 |
| JP | 2002-240674 | 8/2002 |
| JP | 3334570 | 8/2002 |

* cited by examiner

*Primary Examiner*—David R. Dunn
(74) *Attorney, Agent, or Firm*—Hamre, Schumann, Mueller & Larson, P.C.

(57) ABSTRACT

In an occupant restraint system C, an airbag 21 is inflated by using gas, which is generated by an inflator 35 upon a vehicle collision, to be deployed into a shape of curtain along the inner surface of a side of a vehicle compartment. The occupant restraint system C includes pluralities of cells 21c and 21d, which are inflated along the inner surfaces of a B-pillar 15 and a C-pillar 16. By inclining axes S1 to S4 of the cells 21c and 21d with respect to an axis P1 of the B-pillar 15 or an axis P2 of the C-pillar 16, the lower ends of these cells 21c and 21d are hardly trapped by the B-pillar 15 or the C-pillar 16. Thus, the cells of the airbag are prevented from being trapped by the pillars to thereby enable the smooth deployment of the airbag.

4 Claims, 7 Drawing Sheets

FIG.1 WHEN AIRBAG IS NOT DEPLOYED

FIG.2 WHEN AIRBAG IS DEPLOYED

OCCUPANT RESTRAINT SYSTEM

BACKGROUND OF THE INVENTION

1. Field of the Invention

The present invention relates to an occupant restraint system, in which a folded airbag is disposed along a side of a roof, and the airbag is inflated by gas generated by an inflator upon a vehicle collision to be deployed into a shape of curtain along the inner surface of the side of a vehicle compartment.

2. Description of the Related Art

The occupant restraint system is publicly known as disclosed in, for example, Japanese Patent Publication No. 3334570. This occupant restraint system includes a plurality of cells branching downward from gas distribution paths which extend along the upper rims of the airbag. Gas generated by an inflator is distributed to the upper end of each cell from the gas distribution paths, and the cells are cylindrically inflated. Thus, the occupant restraint system restrains an occupant.

A center pillar disposed on the inner surface of a side of a vehicle compartment of an automobile protrudes further inside than the door panes, which are positioned in the front and rear thereof, toward the vehicle compartment. Moreover, the side of the center pillar facing the compartment is provided with a through anchor of a seat belt. Accordingly, if one of the cells of the airbag, which is deployed downward from the side rim of the roof, extends so as to overlap with the center pillar, it is hard for the cell to come off when the lower end thereof is trapped by the center pillar. Hence, there has been a possibility that the airbag is prevented from being deployed smoothly.

SUMMARY OF THE INVENTION

The present invention has been devised in consideration of the foregoing circumstances. An object of the present invention is to prevent a cell of the airbag from being trapped in order for the airbag to be deployed smoothly.

To achieve the above object, according to a first feature of the present invention, there is provided an occupant restraint system, in which an airbag including a plurality of cells branching downward from gas distribution paths extending along an upper rim of a base cloth is folded and disposed on a side of a roof, gas generated by an inflator upon a vehicle collision is supplied to the cells through the gas distribution paths, and the airbag is inflated and deployed into a shape of curtain along an inner surface of a side of a vehicle compartment, wherein extension directions of the cells inflated along an inner surface of at least one of pillars are inclined with respect to extension directions of the pillars.

According to the foregoing structure, among the plurality of cells of the airbag deployed into a shape of curtain along the inner surface of the side of the vehicle compartment, the extension directions of the cells inflated along the inner surfaces of the pillars are inclined with respect to the extension directions of the pillars. Thus, the lower ends of the cells are hardly trapped by the pillars. This enables the smooth deployment of the airbag.

According to a second feature of the present invention, in addition to the first feature, the extension directions of the cells are inclined with respect to a vertical direction.

According to the foregoing structure, the extension directions of the cells are inclined with respect to the vertical direction. Thus, when the side of the vehicle is collided with an obstacle such as a tree or a pole which extends in the vertical direction, it is possible to prevent the obstacle and the head of the occupant from coming into a region between two adjacent cells, where the effects of impact absorption are low. Therefore, it is possible to secure effective impact absorption performance.

A B-pillar 15 and a C-pillar 16 in embodiments correspond to the pillars of the present invention.

DESCRIPTION OF THE PREFERRED EMBODIMENTS

Embodiments of the present invention are described below with reference to the accompanying drawings.

FIGS. 1 to 6 show a first embodiment of the present invention.

Figure 1:
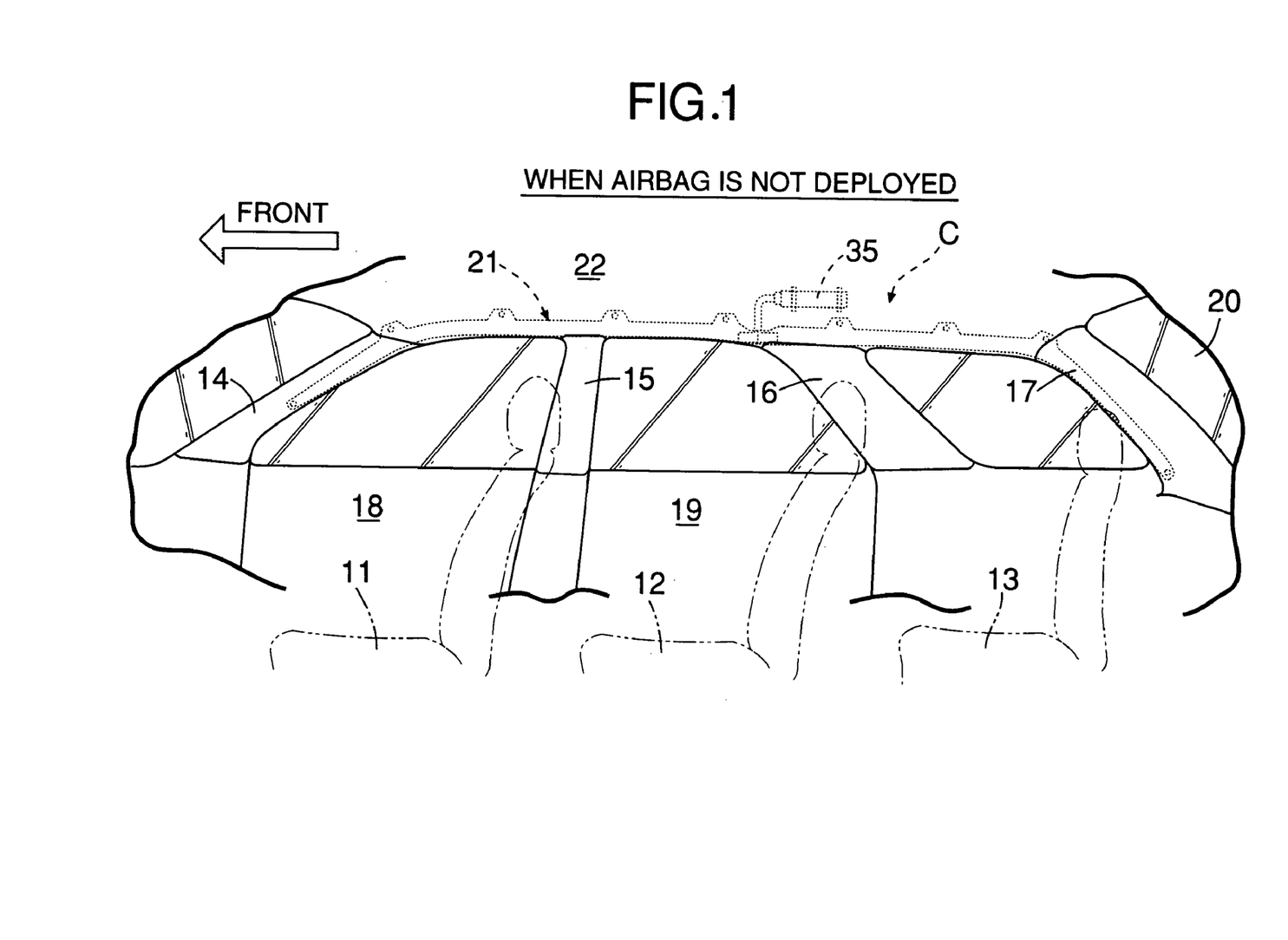
FIG. 1 is a view showing the inside of a vehicle compartment when an airbag is not deployed.

As shown in FIG. 1, a recreational vehicle provided with a front seat 11, a center seat 12 and a rear seat 13 includes A-pillars 14, B-pillars 15, C-pillars 16, and D-pillars 17. Front doors 18 are disposed between the A-pillars 14 and the B-pillars 15. Rear doors 19 are disposed between the B-pillars 15 and the C-pillars 16. A tail gate 20 is disposed in the rear of the D-pillars 17. A folded airbag 21 of each of occupant restraint systems C is stored in a front-back direction of a vehicle body along a side of a roof 22 interposed between the A-pillars 14 and the D-pillars 17. Substantially the same occupant restraint system C is provided on each side (left and right) of the vehicle body. Hereinafter, the occupant restraint system C provided on the right side of the vehicle body is described as an example.

Figure 2:
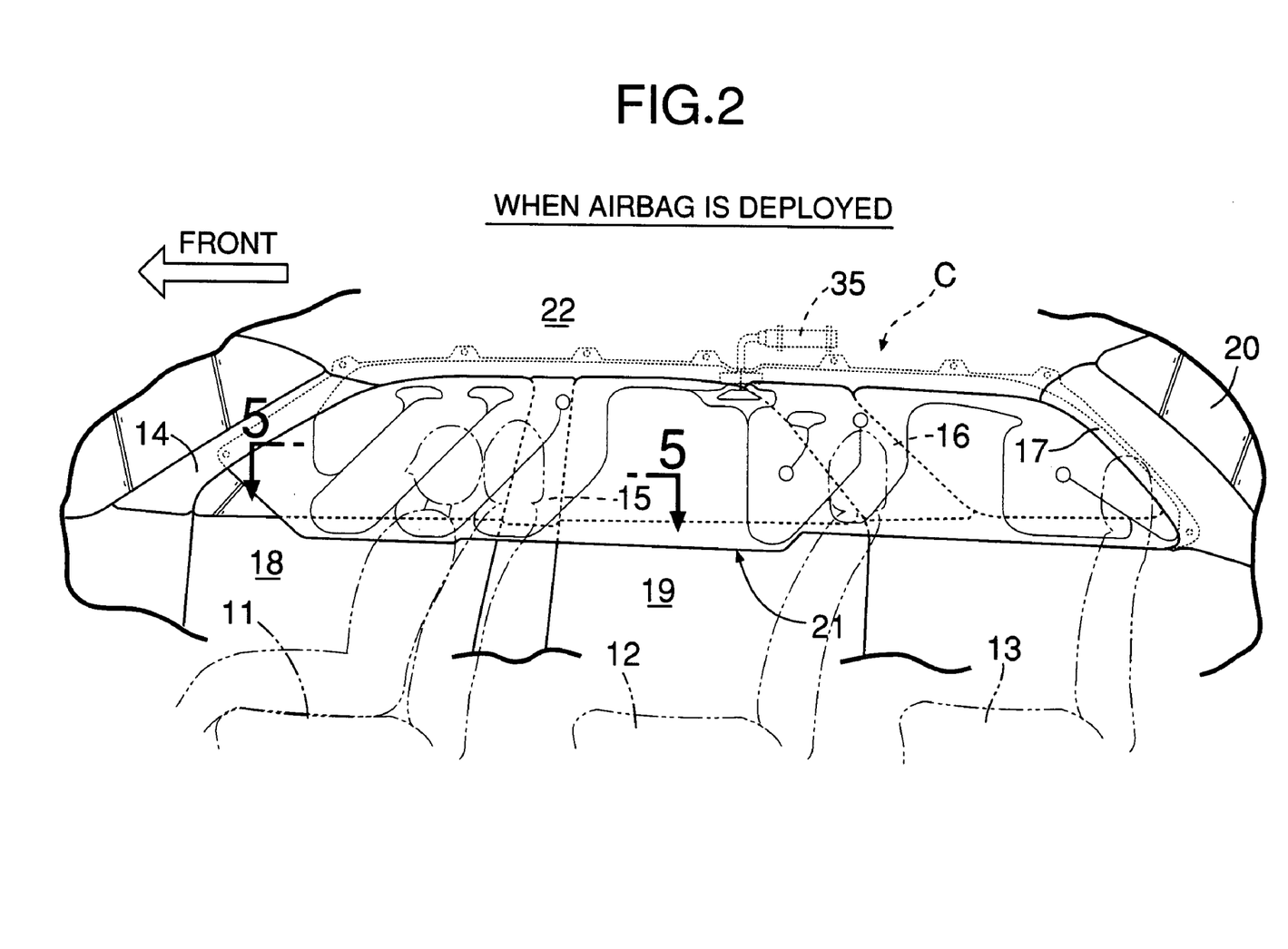
FIG. 2 is a view showing the inside of the vehicle compartment when the airbag is deployed.
Figure 3:
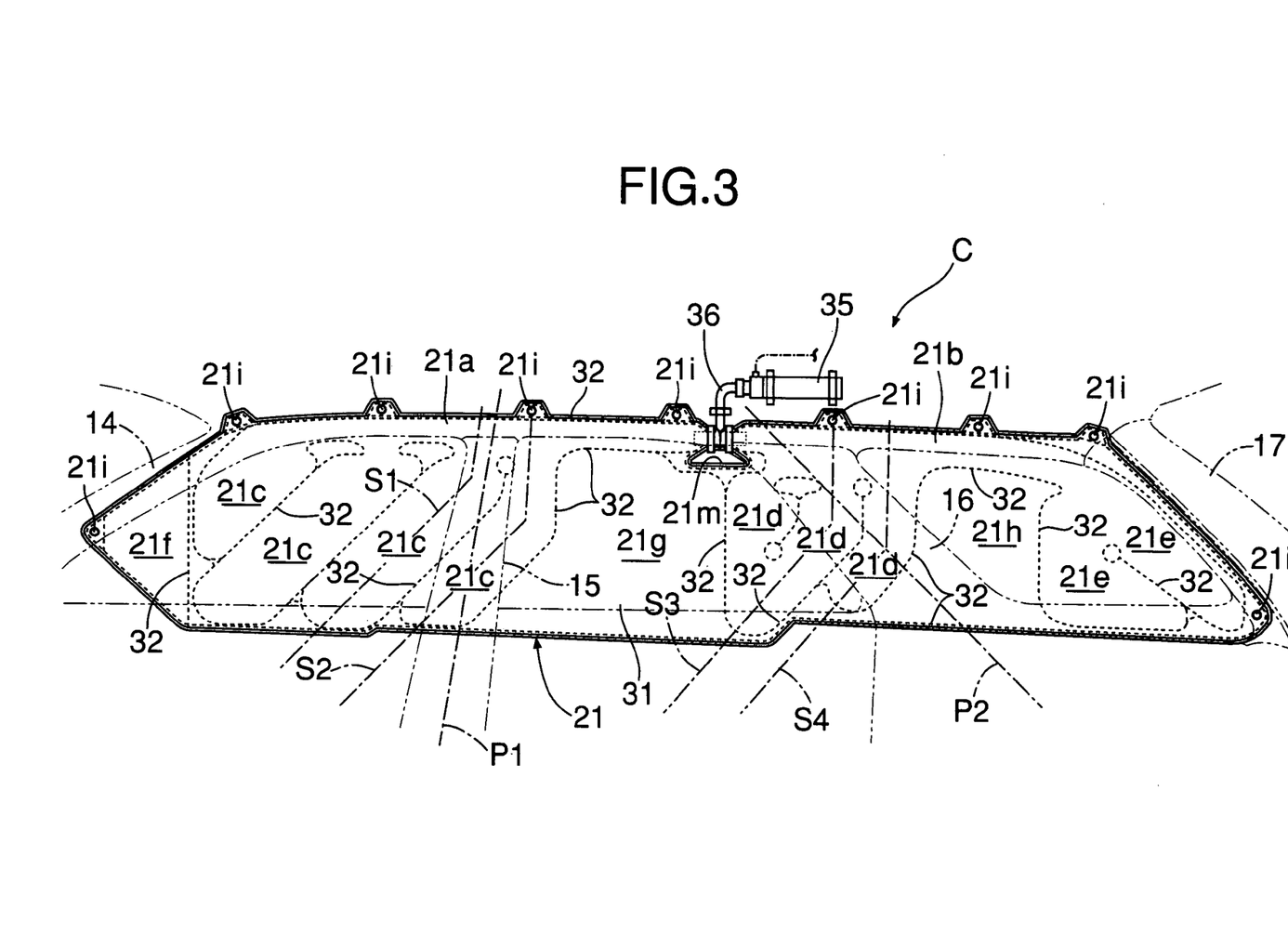
FIG. 3 is an enlarged view of the essential parts in FIG. 2.
Figure 4:
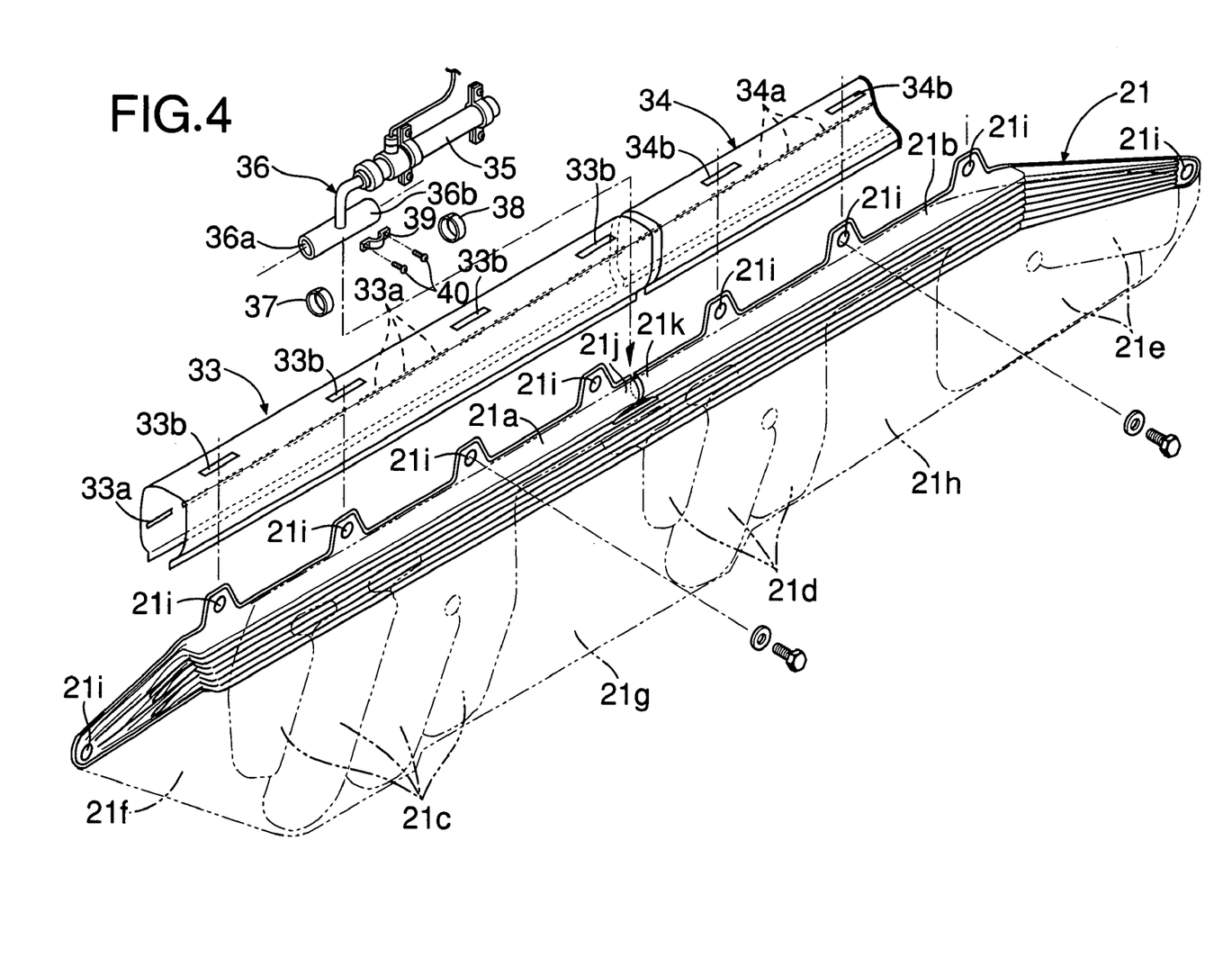
FIG. 4 is an exploded perspective view of an occupant restraint system.

As apparent from FIGS. 2 to 4, the airbag 21 is made of two sheets of cloths 31 by stitching (seams 32). The airbag 21 includes front and rear cylindrical gas distribution paths 21a and 21b, which extend in the front-back direction along the upper rim of the base cloths 31. The airbag 21 also includes pluralities of cells 21c, 21d, and 21e. The plurality of cells 21c branch downward from the front gas distribution path 21a and protect the head of an occupant on the front seat 11. The plurality of cells 21d branch downward from the rear gas distribution path 21b and protect the head of an occupant on the center seat 12. The plurality of cells 21e branch downward from the rear gas distribution path 21b and protect the head of an occupant on the rear seat 13.

A non-inflatable portion 21f, which is not supplied with gas, is formed in front of the cells 21c for the occupant on the front seat 11. A non-inflatable portion 21g, which is not supplied with gas, is formed between the cells 21c for the occupant on the front seat 11 and the cells 21*d* for the occupant on the center seat 12. A non-inflatable seat portion 21*h*, which is not supplied with gas, is formed between the cells 21*d* for the occupant on the center seat 12 and the cells 21*e* for the occupant on the rear seat 13. A plurality of attaching portions 21*i* are formed along the upper rim of the airbag 21 and fixed to the roof 22, the A-pillar 14, and the D-pillar 17.

The folded airbag 21 is wrapped by cloth covers 33 and 34 provided in the front-back direction. Each of the covers 33 and 34 is sewn along the lower rim to be cylindrical. Tearing covers 33 and 34 along perforations 33*a* and 34*a*, which are formed along a longitudinal direction of the covers 33 and 34, enables inflation of the airbag 21. The plurality of attaching portions 21*i* formed along the upper rim of the airbag 21 protrude upward through openings 33*b* and 34*b* formed on the upper surfaces of the covers 33 and 34.

An inflator 35 is disposed on a side of the roof 22 facing the upper end of the C-pillar 16. A gas supply pipe 36 extends forward from one end of the inflator 35, bends downward, and branches in two directions, front and back. A front gas nozzle 36*a* of the gas supply pipe 36 is inserted into a front gas supply port 21*j*, which is located at the rear end of the front gas distribution path 21*a*, and fixed by a fixing band 37. A rear gas nozzle 36*b* of the gas supply pipe 36 is inserted into a rear gas supply port 21*k*, which is located at the front end of the rear gas distribution path 21*b*, and fixed by a fixing band 38. At this time, the base cloths 31 are cut out in a trapezoid shape below the front and rear gas supply ports 21*j* and 21*k* without interfering with the fixing bands 37 and 38, thereby forming an opening 21*m*. A fixing member 39 is fit to a portion of the gas supply pipe 36, which extends in a vertical direction. Both ends of the fixing member 39 are fixed by two bolts 40 and 40.

As most clearly shown in FIG. 3, the deployment shapes of the four cells 21*c*, which restrain the occupant on the front seat 11, are basically inclined from the upper rear to the lower front. Among the cells, parts of two rear cells 21*c* and 21*c* overlap with the side of the B-pillar 15 facing the vehicle compartment. Axes S1 and S2 of the two cells 21*c* and 21*c* are inclined with respect to an axis P1 of the B-pillar 15. Among the three cells 21*d*, which restrain the occupant on the center seat 12, the deployment shapes of two rear cells 21*d* and 21*d* are basically inclined from the upper rear to the lower front. Parts of these two cells 21*d* and 21*d* overlap with the side of the C-pillar 16 facing the vehicle compartment. Axes S3 and S4 of the two cells 21*d* and 21*d* are inclined with respect to an axis P2 of the C-pillar 16.

Next, the operations of the embodiments of the present invention having the foregoing structure are described.

When an acceleration sensor detects a sideway collision or a rollover of the vehicle, the inflator 35 operates by a command from an electronic control unit. Gas accumulated in the inflator 35 is supplied to the front and rear gas distribution paths 21*a* and 21*b* of the airbag 21 through the gas supply pipe 36. From the gas distribution paths 21*a* and 21*b*, the gas flows into each of the cells 21*c*, 21*d*, and 21*e*. As a result, the folded airbag 21 stored along the side of the roof 22 is inflated, and the pressure thereof pushes down a roof garnish to form openings. Thereafter, the airbag 21 is deployed downward in the vehicle compartment through the openings. The front cells 21*c* of the deployed airbag 21 protect the head of the occupant on the front seat 11. The center cells 21*d* protect the head of the occupant on the center seat 12. The rear cells 21*e* protect the head of the occupant on the rear seat 13.

At this time, as shown in FIG. 3, since the axes S1 and S2 of the two cells 21*c* and 21*c*, which are deployed along the B-pillar 15, are inclined with respect to the axis P1 of the B-pillar 15, the two cells 21*c* and 21*c* are hardly trapped by the B-pillar 15. Accordingly, the airbag 21 can be smoothly deployed. Similarly, the axes S3 and S4 of the two cells 21*d* and 21*d*, which are deployed along the C-pillar 16, are inclined with respect to the axis P2 of the C-pillar 16. Thus, these two cells 21*d* and 21*d* are hardly trapped by the C-pillar 16, thereby enabling the smooth deployment of the airbag 21.

Because the cells 21*c*, 21*c*, 21*d*, and 21*d* are inflated in a direction inclined with respect to the B-pillar 15 or the C-pillar 16, these cells 21*c*, 21*c*, 21*d*, and 21*d* come off easily even when the lower ends thereof are trapped.

Figure 5:
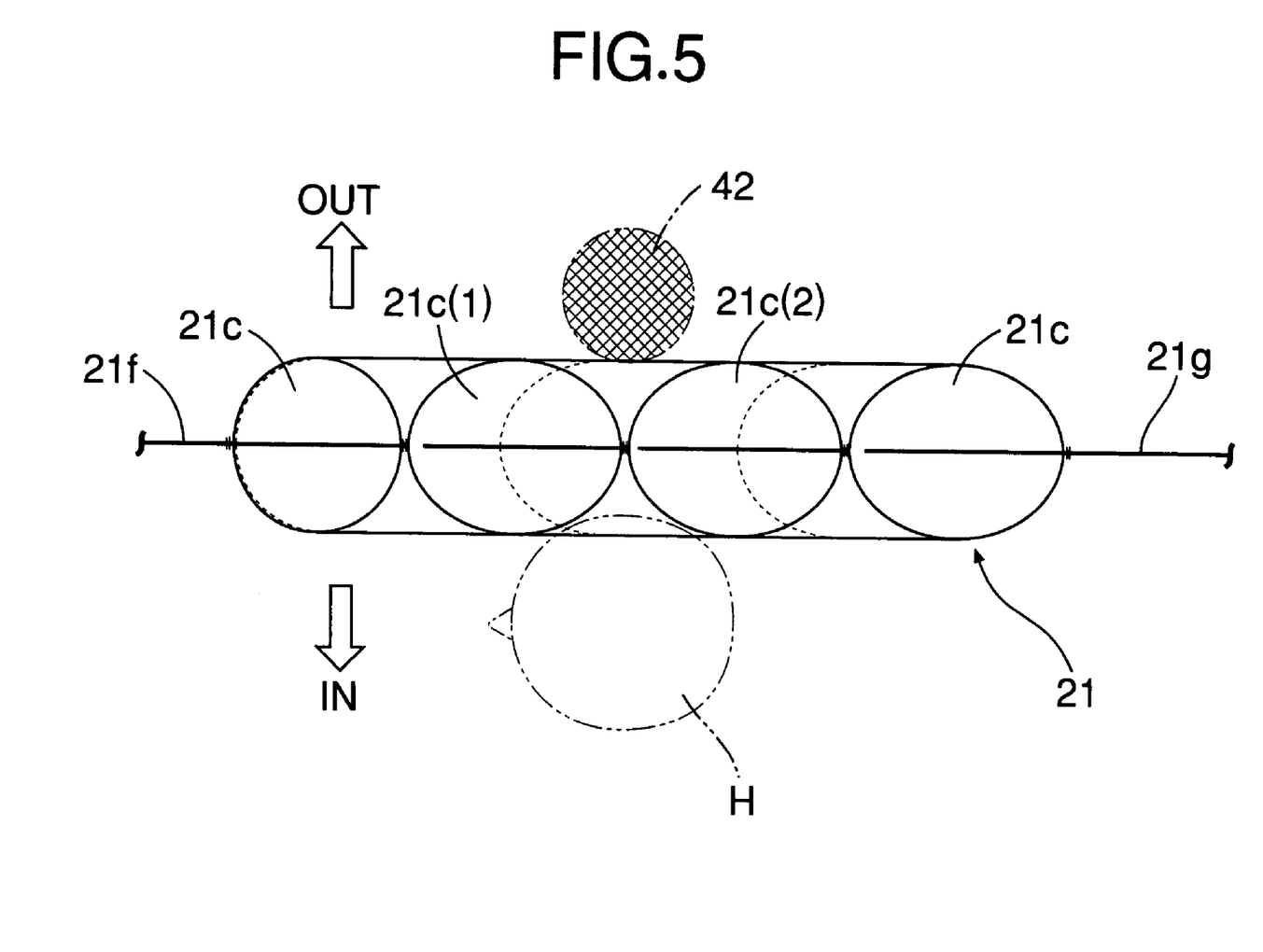
FIG. 5 is an enlarged sectional view taken on line 5—5 of FIG. 2.

In addition, as shown in FIGS. 3 and 5, the axes S1 and S2 of the cells 21*c* and 21*c*, which are located close to a head H of the occupant, are inclined with respect to a vertical direction. Accordingly, when the side of the vehicle collides with an obstacle 42, such as a tree or a pole extending substantially in the vertical direction, it is possible to prevent the obstacle 42 and the head H of the occupant from coming into a region between two adjacent cells 21*c*(1) and 21*c*(2), where the effects of impact absorption are low. Moreover, it is possible to avoid the situation where the two cells 21*c*(1) and 21*c*(2) cannot effectively absorb the impact caused by the obstacle 42. It is because the two cells 21*c*(1) and 21*c*(2), of which axes S1 and S2 are inclined with respect to an extension direction of the obstacle 42, are located at positions where at least parts of the cells in the vertical direction can protect the head H of the occupant.

In the embodiment shown in FIG. 5, the upper portions (indicated by solid lines) of the two cells 21*c*(1) and 21*c*(2) cannot effectively protect the head H of the occupant. However, the lower portion (indicated by a broken line) of the rear cell 21*c*(2) can protect the head H of the occupant effectively.

Figure 6:
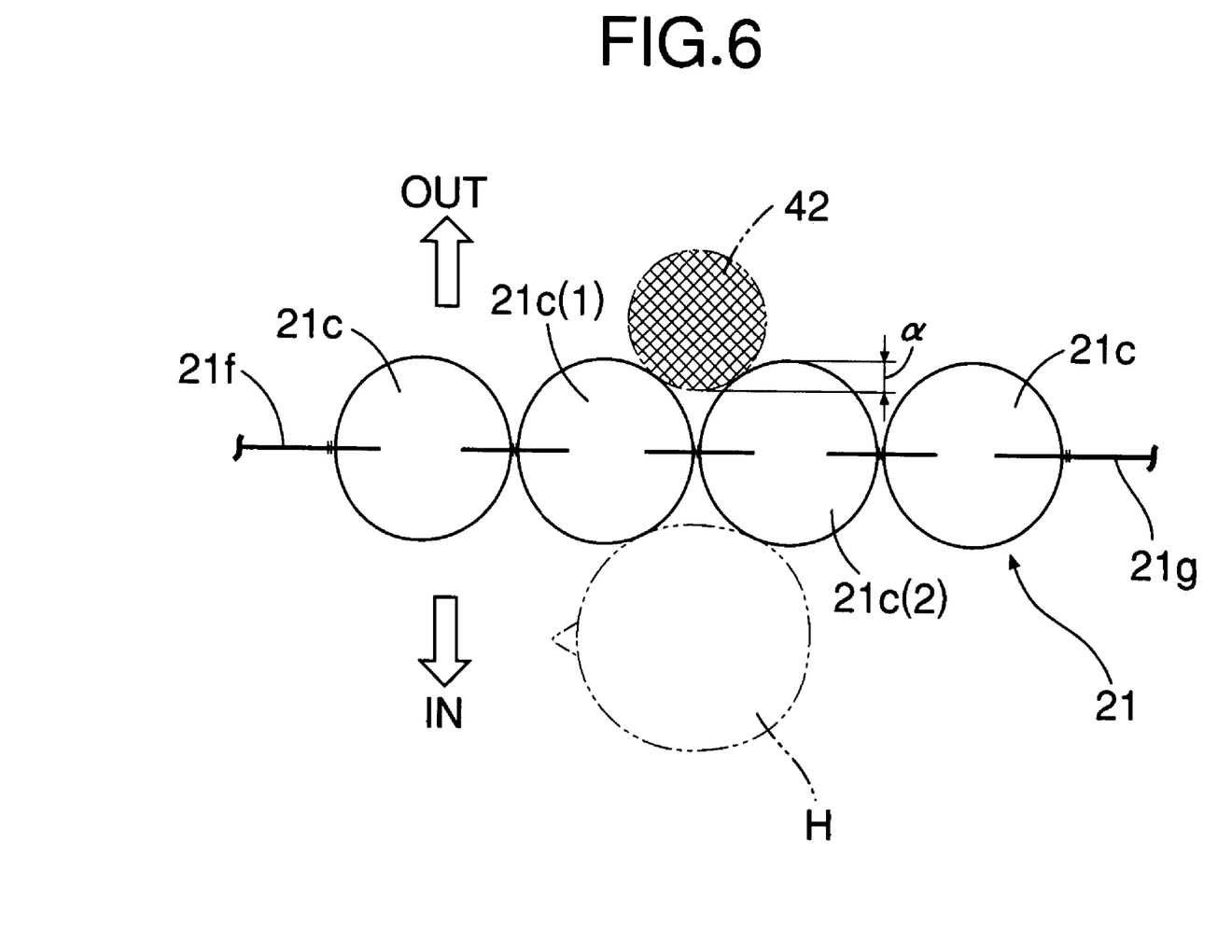
FIG. 6 is an explanatory view of a comparative example corresponding to FIG. 5.

By contrast, as in a comparative example shown in FIG. 6, if the cells 21*c* extend straight in the vertical direction, the obstacle 42 comes into a gap between the two cells 21*c*(1) and 21*c*(2) by a distance α, for example. Accordingly, the thicknesses of the cells 2l*c* (1) and 21*c* (2) are substantially reduced, and the effects of the impact absorption are weakened.

The embodiments of the present invention have been detailed hereinbefore. However, the design of the present invention can be changed without departing from the subject matter thereof.

Figure 7:
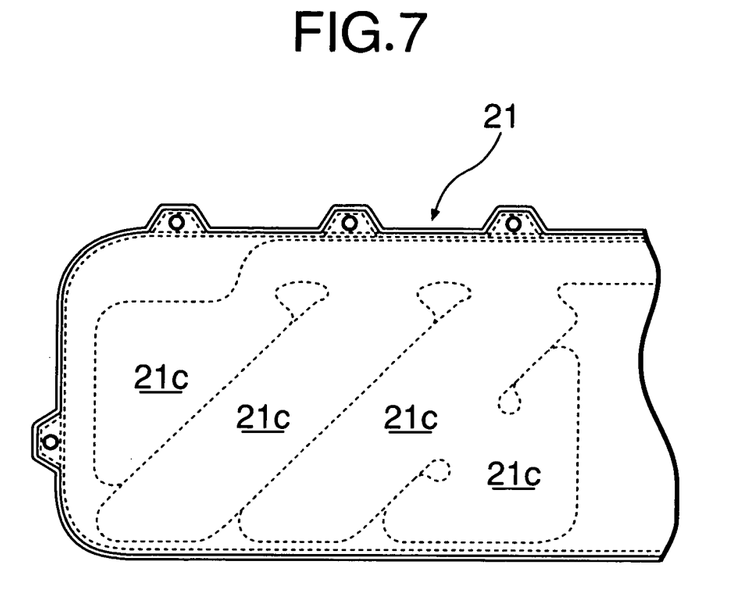
FIG. 7 is a view corresponding to the essential parts in FIG. 3 according to a second embodiment of the present invention.
Figure 8:
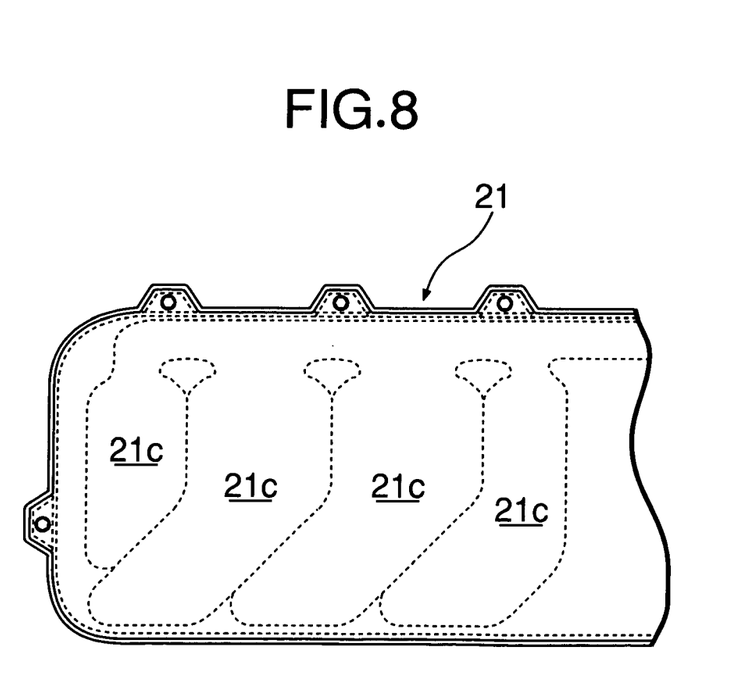
FIG. 8 is a view corresponding to the essential parts in FIG. 3 according to a third embodiment of the present invention.

For example, the cell pattern of the airbag 21 is not limited to that described in the first embodiment. The airbag 21 may have a cell pattern as in the second embodiment or the third embodiment shown in FIG. 7 or 8. In other words, any cell pattern may be used as long as the extension direction of the cells 21*c* (21*d*) incline with respect to the extension direction of the B-pillar 15 (C-pillar 16).

What is claimed is:

1. An occupant restraining system for a vehicle, in which an airbag including a plurality of cells branching downward from a gas distribution path extending along an upper rim of a base cloth is folded and disposed on a side of a roof, gas generated by an inflator upon a vehicle collision is supplied to the cells through the gas distribution path, and the airbag is inflated and deployed into a shape of curtain along an inner surface of a side of a vehicle compartment, wherein at least two adjacent ones of the cells inflated along an inner surface of a pillar have axes thereof extending parallel with each other, said adjacent ones of the cells each comprising an upper portion which extends from the gas distribution path downwardly in a vertical direction, and a lower portion which extends from the upper portion in a direction inclined with respect to both of an extension direction of the pillar and the vertical direction, said extension direction being the direction of an axis of the pillar in a region from the roof to a bottom of a window adjacent to the pillar, said at least two adjacent ones of the cells having lower ends ending at a lower end of the curtain.

2. The occupant restraint system according to claim 1, including another pillar and another at least two adjacent ones of the cells inflated along an inner surface of said another pillar having axes thereof extending parallel with each other and inclined with respect to an extension direction of said another pillar, said extension direction of said another pillar being the direction of an axis of the another pillar in a region from the roof to a bottom of a window adjacent to the another pillar.

3. The occupant restraint system according to claim 1, wherein said at least two adjacent ones of the cells are provided at least in a first inflatable portion of the airbag which is located, upon deployment of the airbag, sidewardly of a front seat of the vehicle.

4. The occupant restraint system according to claim 3, wherein said airbag has a second inflatable portion and a third inflatable portion which are located, upon deployment of the airbag, sidewardly of a center seat and a rear seat of the vehicle, respectively, and non-inflatable portions are formed in the airbag between said first and second inflatable portions and between said second and third inflatable portions, respectively, and said inflator is connected to the gas distribution path of the airbag at a location between said first and second inflatable portions.

* * * * *